BINARY ADDER EMPLOYING NEGATIVE RESISTANCE DIODES

Filed Dec. 27, 1965

| | IN | | | OUT | |
|---|---|---|---|---|---|
| | X | Y | $C_{-1}$ | S | C |
| 1 | 0 | 0 | 0 | 0 | 0 |
| 2 | 1 | 0 | 0 | 1 | 0 |
| 3 | 0 | 1 | 0 | 1 | 0 |
| 4 | 0 | 0 | 1 | 1 | 0 |
| 5 | 1 | 1 | 0 | 0 | 1 |
| 6 | 1 | 0 | 1 | 0 | 1 |
| 7 | 0 | 1 | 1 | 0 | 1 |
| 8 | 1 | 1 | 1 | 1 | 1 |

| | NUMBER OF INPUT SIGNALS | S | C |
|---|---|---|---|
| 1 | 0 | 0 | 0 |
| 2 | 1 | 1 | 0 |
| 3 | 2 | 0 | 1 |
| 4 | 3 | 1 | 1 |

INVENTORS
SAMUEL NISSIM
JOHN P. FRANCIS
BY
Abraham Wasserman
ATTORNEY

BINARY ADDER EMPLOYING NEGATIVE RESISTANCE DIODES

Filed Dec. 27, 1965

INVENTORS
SAMUEL NISSIM
JOHN P. FRANCIS
BY
Abraham Wasserman
ATTORNEY

United States Patent Office 3,420,992
Patented Jan. 7, 1969

3,420,992

BINARY ADDER EMPLOYING NEGATIVE RESISTANCE DIODES

Samuel Nissim and John P. Francis, Malibu, Calif., assignors to The Bunker-Ramo Corporation, Stamford, Conn., a corporation of Delaware Filed Dec. 27, 1965, Ser. No. 516,228
U.S. Cl. 235—176 9 Claims
Int. Cl. H03k *23/36;* G06f *3/00*

ABSTRACT OF THE DISCLOSURE

A binary adder circuit for providing sum and carry output information. The circuit is comprised of first and second tunnel diodes connected in series, each switchable between a high-current low-voltage "0" state and a low-current high-voltage "1" state. The first and second tunnel diodes respectively provide carry and sum output information in response to three input signals applied thereto. The carry tunnel diode is biased to switch to its "1" state only when two or more "1" input signals are applied thereto. The number of "1" input signals required to switch the sum tunnel diode to a "1" state depends on the state of the carry tunnel diode.

The present invention relates generally to digital computer circuitry and, more particularly, to circuitry for performing binary additions.

Circuits which perform various arithmetic operations, including binary addition, are extensively used in presently known computers. One of the circuits, known as a full adder, performs full binary addition on three input signals which comprise the augend and addend binary digits of a corresponding order of two binary numbers and a carry binary digit from a lower binary order. The two output signals of the full adder represent a sum binary digit and a carry binary digit, the latter being supplied to an adder of a succeeding order of the two numbers, The binary digits or quantities such as a binary "one" (1) or a binary "zero" (0) are represented by the voltage levels of the input and output signals. Hereafter, it will be assumed that a positive voltage signal or one above a given level represents a binary one, while a signal of zero volts or one below a given level represents a binary zero.

The full binary adder produces a sum output signal representing a binary one only when an odd number of the three input signals represent binary ones. A carry output signal representing a binary one is produced only when more than one input signal represents a binary one.

Since speed and reliability of operation are among the most significant characteristics of computers, it is a general design objective to provide circuits such as full binary adders which operate reliably at high speeds. The reliability is generally improved by providing simple circuits with a minimum number of components, so as to minimize the maintenance problems as well as reduce the over-all cost of the system. The present invention is directed to provide a full binary adder which possesses the above-enumerated characteristics in that it includes but a few circuit components which to gether are reliably operable at high speeds to perform the function of a full adder.

Briefly, the full binary adder of the present invention is based on the two stable states of operation, as well as the negative resistance characteristics of two negative-resistance elements such as tunnel diodes. The two diodes, each of which is adapted to respond to as many as three input signals, are interconnected and biased, so that their stable states of operation are directly related to the number of input signals in the same relationship that the sum and carry signals in a full adder are related to the three possible input signals therein. Thus, the stable states of operation of the two diodes represent sum and carry signals which are produced as a function of the number of input signals supplied to the two tunnel diodes.

Each of the two tunnel diodes has two stable states of operation, known as the high-current low-voltage state and the low-current high-voltage state, which in the present invention are assumed to represent a binary zero and a binary one respectively. Hereafter the high-current low-voltage state will be also referred to as the zero state and the low-current high-voltage state will be referred to as the one state. Initially the two diodes, which hereafter will be referred to as the sum diode and the carry diode, are biased to be in their zero states. The carry diode is biased to switch to its one state only when two or more input signals representing a binary one are supplied thereto. On the other hand, the number of input signals representing a one which are necessary to switch the sum diode to its one state depends on the state of operation of the carry diode. When the latter diode is in the zero state, the sum diode switches to its one state when supplied with a single input signal representing a binary one. However, whenever the carry diode is in the one state, the sum diode switches to its one state only when being supplied with three input signals representing binary ones. Thus, the states of operation of the sum and carry diodes represent sum and carry signals respectively, which are directly related to the number of input signals representing binary ones which are supplied to the diodes, and therefore the two diodes perform together the functions of a full binary adder.

The use of tunnel diodes accounts for the high speed with which binary addition is performed by the full adder of the invention, since the switching time of the tunnel diodes from one state to another is extremely short. Full binary addition may be accomplished in less than 50 nanoseconds. Furthermore, by using only two tunnel diodes and a few components necessary for proper biasing of the diodes, the over-all number of elements in the adder is small and therefore the potential sources of malfunction or failure are greatly minimized. Consequently, the adder is highly reliable as well as relatively inexpensive.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURES 1(*a*) and 1(*b*) are truth charts of a full binary adder;

Attention is now directed to FIG. 1(*a*), which is the truth chart of a full binary adder, X and Y representing the input signals of the augend and addend binary digits of a corresponding order of two binary numbers and $C_{-1}$ representing a carry input signal from a lower binary order. The letters S and C represent the sum signal and carry signal respectively of the full binary adder. A sum signal representing a one is produced only when an odd number of the possible input signals represent a one and a carry signal is produced only when two or more of the three input signals represent binary ones. Thus, the truth chart may be condensed as shown in FIG. 1(*b*), wherein the sum and carry signals are shown or identified with respect to or as a function of the number of input signals, rather than the different sources (such as augend, addend and lower binary order) from which the input signals are received.

Figures 1A, 1B, 2:
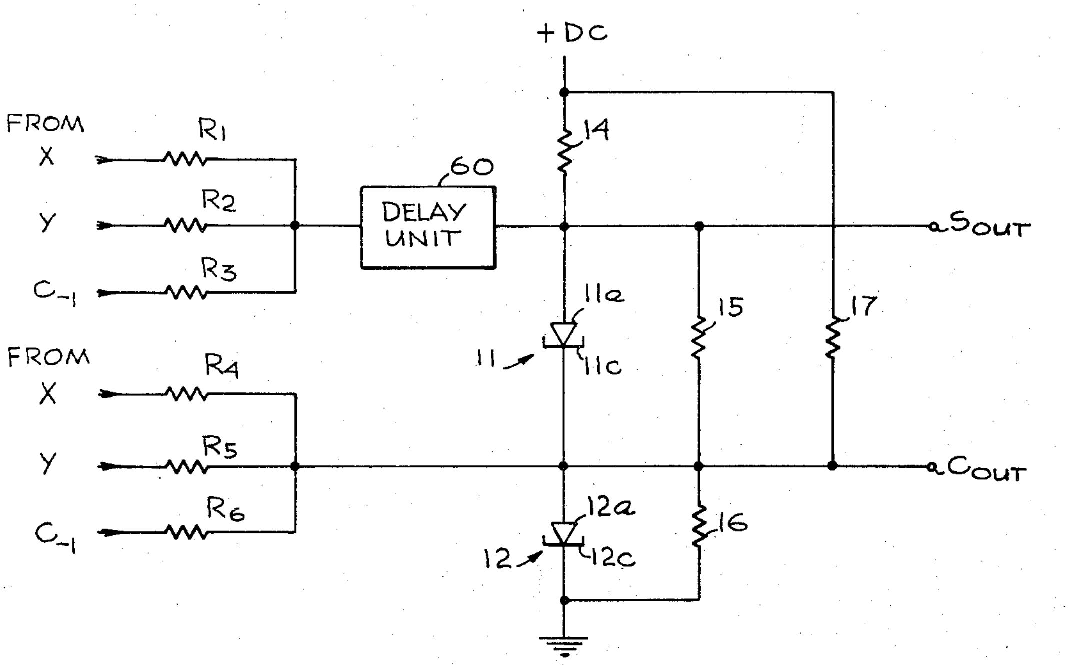
FIG. 2 is a schematic diagram of the full binary adder of the present invention.

Reference is now made to FIG. 2, which is a schematic diagram of one embodiment of the full adder of the invention. As seen, the adder comprises two bistable negative resistance elements such as tunnel diodes 11 and 12, hereinafter referred to simply as diodes 11 and 12. The diodes are connected in series with a resistor 14, between a source of positive potential designated +DC and a lower potential level designated as ground. An anode 11*a* of the tunnel diode 11 is connected to one terminal of the resistor 14, and a cathode 11*c* of the diode 11 is connected to an anode 12*a* of the diode 12. A cathode 12*c* of the diode 12 is connected to ground, and the other terminal of the resistor 14 is connected to the potential source +DC. In addition, the tunnel diodes 11 and 12 are shunted across by resistors 15 and 16, respectively, with a resistor 17 being connected in parallel across the resistor 14 and the tunnel diode 11. The anode 11*a* is connected to input signal sources X, Y, and $C_{-1}$ through resistors $R_1$, $R_2$, and $R_3$, respectively. In another embodiment of the invention, the anode 11*a* is connected to resistors $R_1$, $R_2$, and $R_3$ through a delay unit 60, the function of which will be described hereinafter in detail. Similarly, the tunnel diode 12 is connected by means of its anode 12*a* to the same three input signal sources through resistors $R_4$, $R_5$, and $R_6$. Thus an input signal from any one of the three sources may be supplied simultaneously to the two tunnel diodes 11 and 12.

Figure 3:
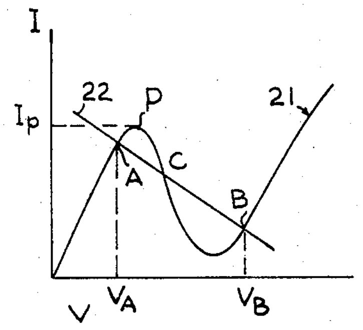
FIG. 3 is a current-voltage characteristic curve of a negative-resistance element such as a tunnel diode.

For a better appreciation of the novel circuit disclosed and, in particular, the mode of operation of the two tunnel diodes 11 and 12, reference is made to FIG. 3, which is a current-voltage diagram of a bistable negative resistance element such as a tunnel diode, represented by curve 21 plotted together with a load line 22 which intersects the curve 21 at points A and B. The points of intersection are controlled by elements such as resistors which bias the diode to operate in a predetermined manner. As is well known in the art, the points A and B represent two stable states of operation of the tunnel diode. The voltage across the diode after the removal of all input signals is either $V_A$ or $V_B$, depending upon whether the input signals previously supplied to the diode caused it to switch to the low voltage state or the high voltage state.

The stable state represented by point A is characterized by high current and low voltage, which, as hereinbefore defined, may also be referred to as the zero state, while the stable state represented by point B is characterized by low current and high voltage, representing a one state. It should be pointed out that the load line 22 also intersects the curve 21 at a point C, representing an unstable state of operation, which need not be considered for the purposes of the present invention.

In order to switch the tunnel diode from the zero state to the one state, it is necessary to temporarily effectively move the load line 22 from its quiescent position with respect to the curve 21 so as to shift the point of operation past a peak designated P, thereby permitting the tunnel diode to assume its one state (point B) when a quiescent condition is again established. In order, therefore, to move the load line past the peak P, the current through the tunnel diode need be increased above the value of the peak current $I_P$. Such characteristics of tunnel diodes underlie the operation of the adder of the present invention.

Figure 4:
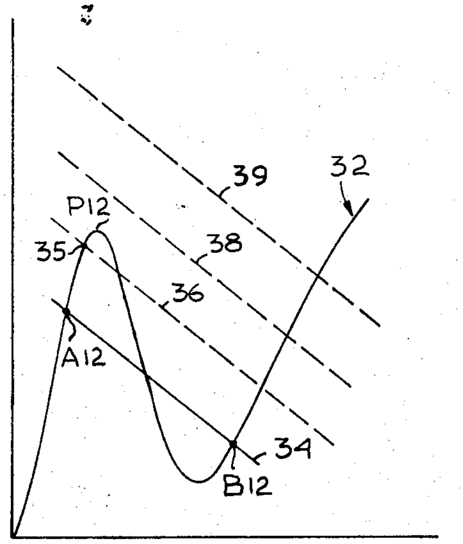
FIGS. 4 and 5 are current voltage characteristic curves useful in explaining the principles of operation of the present invention.

The current-voltage characteristics of tunnel diode 12 are diagrammed by a curve 32 in FIG. 4 to which reference is made herein. Points A12 and B12 at the points of intersection of a load line 34 with curve 32 represent the zero state and the one state, respectively, of diode 12. The diode is biased so that when one, two, or three input signals, each representing a binary one, are supplied thereto, the load line shifts, as indicated by dashed lines 36, 38, and 39, respectively. From FIG. 4 it should be appreciated that, if one input signal representing a one is supplied, the load line 36 is not shifted above peak P12 and therefore the diode remains in its zero state. Only when two or more input signals representing ones are supplied to diode 12 do the load lines (38 or 39) shift above the peak P12 so that the diode is shifted to the one state. Thus the state of diode 12 is related to the number of input signals representing binary ones in the same manner that the carry signal in a full binary adder is related to the input signals representing binary ones which are supplied to the adder. The state of diode 12, which represents the carry signal, may be conveniently detected by measuring the voltage drop across the diode. In FIG. 2 the letter $C_{out}$ designates the carry output terminal of the full binary adder of the present invention.

Figure 5:
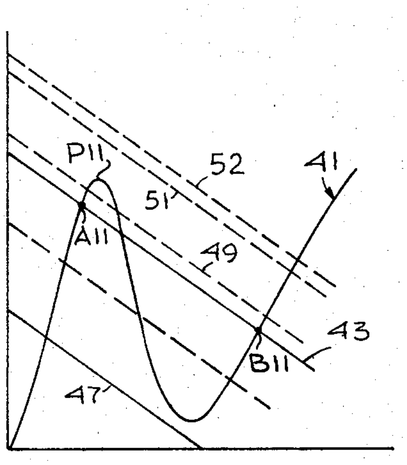

Reference is now made to FIG. 5, in which curve 41 represents the current-voltage characteristics of tunnel diode 11. As long as diode 12 is in the zero state, line 43 represents the load line of diode 12. Whenever a single input signal representing a one is supplied thereto, the load line is shifted above peak P11, as indicated by line 51, switching diode 11 to its one state. However, when due to two or more input signals, representing binary ones, diode 12 is switched to its one state, the load line of diode 11 is lowered as indicated by line 47. The line is lowered to a level so that, even when two input signals representing ones are supplied to diode 12, the load line shifts to the position indicated by line 49, which is below peak P12. Consequently diode 11 remains in the zero state. Only when three input signals representing ones are supplied to diode 12 does the load line, as indicated by line 52, shift above the peak P11, so that diode 11 is switched to its one state. Thus, the state of diode 11 may be used to provide the sum signal of the full binary adder, since the diode remains in a zero state when only two input signals representing ones are supplied thereto, and is switched to the one state only when being supplied by an odd number of input signals (one or three) representing binary ones. In FIG. 2, the letter $S_{out}$ designates the sum output terminal of the novel full adder of the present invention.

From the foregoing description is should thus be appreciated that in the full binary adder of the present invention the states of diodes 11 and 12 are used to indicate the sum and carry output signals, the states of the diodes being a function of the number of input signals representing binary ones. The state of diode 12, which is the carry diode, is only dependent upon the number of input signals representing ones, the diode switching to its one state when more than one of the input signals represents a one. However, the switching of diode 11, which is the sum diode, depends upon the number of input signals representing ones and the state of carry diode 12. Therefore it is necessary that the carry diode 12 be switched first to its proper state before the proper switching of sum diode 11 can take place.

Controlling the switching of the diodes may be conveniently accomplished by selecting two diodes which have different switching time characteristics. For example, carry diode 12 may be chosen to be a germanium diode, the switching time of which is approximately 10 nanoseconds, while diode 11 may be a silicon diode, which switches in approximately 50 nanoseconds. In another embodiment of the invention, delaying the switching of diode 11 to occur after the switching of diode 12 is accomplished by delaying the input signals supplied to diode 11 in a delay unit 60 so that diode 11 responds to the signals only after diode 12 has already assumed its proper state. However, irrespective of the technique employed, it is important for the proper performance of the full binary adder of the present invention that carry diode 12 should first be switched to its proper state before the switching of sum diode 11 can take place.

Summarizing briefly, the present invention comprises a novel full binary adder which includes only two negative resistance bistable elements such as the tunnel diodes 11 and 12. The adder of the present invention includes only a minimum number of resistive elements needed to bias the two diodes and supply the input signals thereto. In addition, the full binary adder of the present invention, by incorporating bistable negative-resistance elements such as tunnel diodes which are capable of switching states in nanosecond time periods, is capable of operating at a very high rate, thereby being able to perform several addition operations in the time necessary for a single operation of a conventional adder. As is apparent to one familiar in the art, the full adder of the present invention may be incorporated in any computing circuitry where conventional full binary adders are used.

The techniques underlying the present invention, namely, the switching of two tunnel diodes from their low-voltage states to their high-voltage states as a function of a plurality of input signals are not limited to a full binary adder, but may be employed in other circuits. For example, the two tunnel diodes 11 and 12 (FIG. 2) may be adapted to be energized by as many as N input signals supplied thereto from N input sources, and be properly biased, so that a predetermined number of the possible N input signals may cause switching to occur in one or both of the diodes.

The foregoing description is considered only illustrative of the principles of the invention. It is appreciated that those familiar with the art may make modifications in the arrangements as shown without departing from the true spirit of the invention. Therefore, all suitable modifications and equivalents are intended to fall within the scope of the invention as claimed.

The embodiments of the invention in which an exclusive property or privilege is claimed are defined as follows:

1. A full binary adder comprising:
- serially connected first and second negative resistance bistable means each having first and second stable states of operation;
- means for energizing each of said first and second bistable means with three input signals, each input signal representing either a binary zero or a binary one; and
- biasing means for controlling the stable states of operation of said first bistable means as a function of only the number of said three input signals which represent a binary one, and for controlling the stable states of operation of said second bistable means as a function of both the number of said three input signals which represent a binary one, and as a function of the stable state of said first bistable means, said first bistable means switching to its second stable state of operation when more than one of said three input signals represent binary ones, and said second bistable means switching to its second stable state of operation when only one of said input signals represents a binary one and said first bistable means is in its first stable state of operation, said second bistable means being switchable to its second stable state of operations when all three of said input signals represent binary ones and said first bistable means is in its second stable state of operation.

2. The full binary adder defined by claim 1, wherein said first and second negative-resistance bistable means comprise first and second tunnel diodes, respectively, said first and second stable states of operation representing the high-current low-voltage state and the low-current high-voltage state, respectively, of each of said tunnel diodes.

3. The full binary adder defined by claim 2, wherein said first tunnel diode has a faster switching time than said second tunnel diode.

4. In a full binary adder wherein, in response to three input signals, a sum and carry output signals representing binary ones are produced as a function of the number of said three input signals which represent binary ones, the arrangement comprising:
- first and second serially coupled negative-resistance bistable elements, each having high-current low-voltage and low-current high-voltage stable states of operation and switchable therebetween;
- means for energizing with said three input signals said first and second bistable elements;
- biasing means including a source of potential energy for switching said first negative-resistance bistable element from said high-current low-voltage stable state to said low-current high-voltage stable state when more than one of said three input signals represent a binary one and for switching said second negative-resistance bistable element from said high-current low-voltage stable state when only one of said three input signals represents a binary one and said first element is in said high-current low-voltage stable state, or when each of said three input signals represents a binary one; and
- means coupled to said first and second bistable elements for providing carry and sum output signals respectively as a function of the potentials thereacross.

5. The full binary adder defined in claim 4, wherein said first and second negative-resistance bistable elements comprise first and second tunnel diodes.

6. The full binary adder defined in claim 5, wherein the time for switching said first tunnel diode from said high-current low-voltage stable state to said low-current high-voltage stable state is shorter than the time required for switching said second tunnel diode from said high-current low-voltage stable state to said low-current high-voltage stable state.

7. The full binary adder defined in claim 4, further including delay means for energizing said second negative-resistance bistable element with said input signals at predetermined time intervals after said first negative-resistance bistable element has been energized therewith.

8. A binary circuit for providing an output signal representing either a binary one or a binary zero as a function of the number of input signals representing binary ones, comprising:
- serially connected first and second negative-resistance bistable elements each having first and second stable states of operation;
- means for energizing each of said first and second elements with N input signals, each input signal representing either a binary zero or a binary one;
- biasing means for switching said first element from said first stable state to said second stable state when X or more of said N input signals represent binary ones, X being smaller than N, and for controlling the switching of said second element from said first stable state to said second stable state as a function of the number of said N input signals which represent binary ones and the stable state of operation of said first element; and
- output means coupled to said first and second elements for providing output signals as a function of the stable states of operation of said first and second elements.

9. The circuit defined in claim 8, wherein said first and second negative-resistance bistable elements comprise first and second tunnel diodes, said first tunnel diode having a faster switching rate than said second tunnel diode.

References Cited

UNITED STATES PATENTS

| | | | |
|---|---|---|---|
| 3,156,816 | 11/1964 | Kosonocky et al. | 235—172 |
| 3,194,974 | 7/1965 | Rymaszewski | 307—88.5 |
| 3,275,813 | 9/1966 | Brastins | 235—176 |
| 3,280,316 | 10/1966 | Jeeves | 235—172 |
| 3,348,033 | 10/1967 | Gruodis et al. | 235—175 |

OTHER REFERENCES

W. A. Sauer: How to Achieve Majority and Threshold Logic with Semiconductors, Nov. 29, 1963, pp. 23–25.

MARTIN P. HARTMAN, *Primary Examiner.*

D. H. MALZAHN, *Assistant Examiner.*

U.S. Cl. X.R.

235—172; 307—206